United States Patent
Kitta et al.

(10) Patent No.: US 9,467,018 B2
(45) Date of Patent: Oct. 11, 2016

(54) ROTARY ELECTRIC MACHINE AND MANUFACTURING METHOD FOR ROTARY ELECTRIC MACHINE

(75) Inventors: Yoshiaki Kitta, Chiyoda-ku (JP); Shogo Okamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 474 days.

(21) Appl. No.: 13/569,934

(22) Filed: Aug. 8, 2012

(65) Prior Publication Data

US 2013/0249334 A1 Sep. 26, 2013

(30) Foreign Application Priority Data

Mar. 22, 2012 (JP) ................. 2012-065293

(51) Int. Cl.
*H02K 3/46* (2006.01)
*H02K 3/52* (2006.01)
*H02K 15/00* (2006.01)

(52) U.S. Cl.
CPC ................ *H02K 3/522* (2013.01); *H02K 3/46* (2013.01); *H02K 15/0031* (2013.01); *Y10T 29/49009* (2015.01)

(58) Field of Classification Search
CPC ............ H02K 3/18; H02K 3/50; H02K 3/02; H02K 15/04; H02K 3/46; H02K 3/52
USPC ............................. 310/194, 215, 71; 29/596
See application file for complete search history.

(56) References Cited

U.S. PATENT DOCUMENTS

| | | | |
|---|---|---|---|
| 5,268,604 A * | 12/1993 | Katakura | 310/71 |
| 6,555,942 B1 * | 4/2003 | Hsu | 310/208 |
| 7,489,061 B2 * | 2/2009 | Nishimura | 310/215 |
| 7,649,295 B2 * | 1/2010 | Fukui et al. | 310/215 |
| 7,923,872 B2 * | 4/2011 | Sahara et al. | 310/71 |
| 7,936,100 B2 * | 5/2011 | Naganawa et al. | 310/71 |
| 8,013,490 B2 * | 9/2011 | Hino et al. | 310/194 |
| 8,461,734 B2 * | 6/2013 | Sahara et al. | 310/71 |
| 8,482,180 B2 * | 7/2013 | Seki | H02K 1/148 310/179 |

(Continued)

FOREIGN PATENT DOCUMENTS

| | | | | |
|---|---|---|---|---|
| CN | 101188367 A | 5/2008 | | |
| DE | 102010017044 | * 12/2010 | ............... | H02K 3/28 |

(Continued)

OTHER PUBLICATIONS

English Machine Translation Anzai et al., JP 2007-074838; Mar. 2007.*

(Continued)

*Primary Examiner* — Burton Mullins
(74) *Attorney, Agent, or Firm* — Sughrue Mion, PLLC; Richard C. Turner

(57) ABSTRACT

The rotary electric machine includes: a stator (1) of concentrated winding in which a stator winding (14) is wound around a stator core (11), the stator core including a coil bobbin (13) and an insulating paper (12); and as a mechanism for supporting a terminal portion of the stator winding extending from the stator disposed in an annular shape, an end portion supporting member (18) for supporting a winding finishing end portion of the stator winding in a substantially linear section (16) of the stator winding, the substantially linear section being provided from a last winding portion of the coil bobbin to the winding finishing end portion.

13 Claims, 5 Drawing Sheets

(56) References Cited

U.S. PATENT DOCUMENTS

| | | | | |
|---|---|---|---|---|
| 8,704,421 B2* | 4/2014 | Schein | ............... | H02K 3/522 |
| | | | | 310/215 |
| 2005/0012413 A1* | 1/2005 | Bott et al. | ............... | 310/71 |
| 2009/0072653 A1* | 3/2009 | Harada | ............... | H02K 3/14 |
| | | | | 310/208 |
| 2010/0194214 A1* | 8/2010 | Takahashi | ............... | H02K 3/522 |
| | | | | 310/43 |

FOREIGN PATENT DOCUMENTS

| | | | | |
|---|---|---|---|---|
| JP | 63-249441 | * | 10/1988 | ............... H02K 3/52 |
| JP | 08-223843 | * | 8/1996 | ............... H02K 3/52 |
| JP | 2000-232745 A | | 8/2000 | |
| JP | 2002-218696 A | | 8/2002 | |
| JP | 2007-074838 A | | 3/2007 | |
| JP | 2008-193889 A | | 8/2008 | |
| JP | 2008-278691 A | | 11/2008 | |
| JP | 2008-312290 A | | 12/2008 | |

OTHER PUBLICATIONS

English Machine Translation Izumi et al., JP 2008-193889; Aug. 2008.*
Japanese Office Action (Preliminary Notice of Reasons for Rejection), Sep. 24, 2013, Patent Application No. 2012-065293.
Communication dated Sep. 16, 2015 from the Chinese Intellectual Property Office issued in corresponding Chinese application No. 201210346930.3.

* cited by examiner

ROTARY ELECTRIC MACHINE AND MANUFACTURING METHOD FOR ROTARY ELECTRIC MACHINE

BACKGROUND OF THE INVENTION

1. Field of the Invention

The present invention relates to a rotary electric machine which includes a fixing structure for a terminal portion of a stator winding and which enables simplification of production equipment and enhancement of production efficiency, and a manufacturing method for the rotary electric machine.

2. Description of the Related Art

In a shape of a terminal portion of a conventional stator winding, a winding finishing terminal portion of the stator winding is wound around a locking portion provided on a coil bobbin so as to prevent a coil wound around the coil bobbin from being loosened (refer to, e.g., Japanese Patent Application Laid-open No. 2008-278691).

However, the conventional technology has the following problem.

In a fixing structure for the terminal portion of the conventional stator winding, a process of locking the winding is required and a structure of a winding machine becomes complicated. As a result, there is a risk of increase of production equipment or deterioration of productivity.

SUMMARY OF THE INVENTION

The present invention has been made in order to solve the above-mentioned problem, and therefore has an object to provide a rotary electric machine which enables simplification of production equipment and enhancement of production efficiency, and a manufacturing method for the rotary electric machine.

According to an exemplary embodiment of the present invention, there is provided a rotary electric machine, including: a stator of concentrated winding in which a stator winding is wound around a stator core, the stator core including a coil bobbin and an insulating paper; and as a mechanism for supporting a terminal portion of the stator winding extending from the stator disposed in an annular shape, an end portion supporting member for supporting a winding finishing end portion of the stator winding in a substantially linear section of the stator winding, the substantially linear section being provided from a last winding portion of the coil bobbin to the winding finishing end portion.

Further, according to an exemplary embodiment of the present invention, there is provided a manufacturing method for a rotary electric machine, the rotary electric machine including a stator of concentrated winding in which a stator winding is wound around a stator core, the stator core including a coil bobbin and an insulating paper, the manufacturing method including winding the stator winding on the stator which is disposed in an annular shape, the winding including: supporting a portion corresponding to a winding finishing end portion by an end portion supporting member provided in a section in which the stator winding becomes substantially linear from a last wound portion of the coil bobbin to a portion corresponding to the winding finishing end portion; and cutting the stator winding after the portion corresponding to the winding finishing end portion is supported in the supporting of the portion corresponding to the winding finishing end portion.

According to the rotary electric machine of the present invention, there is provided the structure which does not require the stator winding terminal portion to be wound on the coil bobbin, and which supports the winding terminal portion so as not to be loosened under a state in which the winding is finished so that the winding terminal portion is substantially linear. As a result, the coil bobbin can be reduced in size and weight, and hence there can be obtained the rotary electric machine which enables simplification of production equipment and enhancement of production efficiency, and the manufacturing method of the rotary electric machine.

DETAILED DESCRIPTION OF THE PREFERRED EMBODIMENTS

A rotary electric machine and a manufacturing method for a rotary electric machine according to exemplary embodiments of the present invention are described with reference to the drawings hereunder.

First Embodiment

Figure 1:
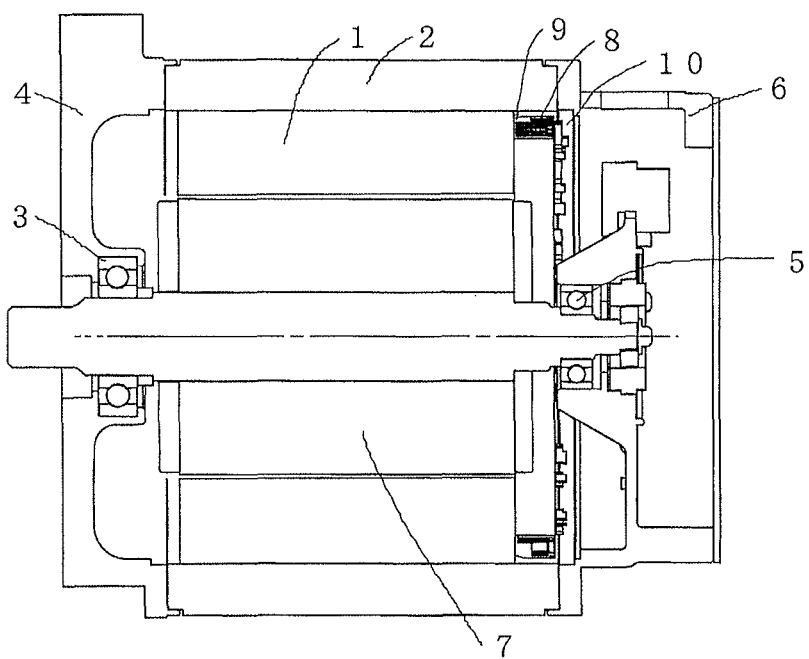
FIG. 1 is a schematic diagram of a rotary electric machine according to a first embodiment of the present invention.

FIG. 1 is a schematic diagram of a rotary electric machine according to a first embodiment of the present invention. A stator 1 disposed in an annular shape is fitted into a tubular center frame 2. A rotor 7 is supported by a load-side bearing 3 held on a front frame 4, and a non-load-side bearing 5 held on a rear frame 6.

On an end surface of the stator 1 on the non-load side, there are disposed a bus bar 8 for supplying electricity to U-, V-, and W-phases, a bus bar holder 9 for containing the bus bar 8, and a connection plate 10 provided on the bus bar holder 9.

Figure 2A:
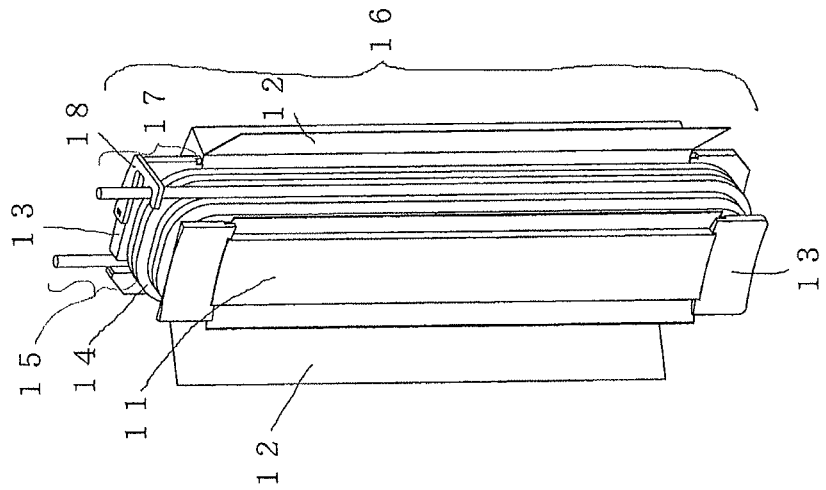
FIG. 2(A) illustrates a front view of a stator and an end portion supporting structure for a winding which are to be applied to the rotary electric machine according to the first embodiment according to the present invention.
Figure 2B:
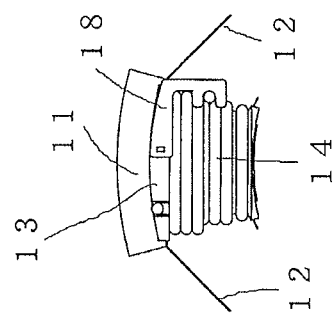
FIG. 2(B) illustrates a top view of a stator and an end portion supporting structure for a winding which are to be applied to the rotary electric machine according to the first embodiment according to the present invention.
Figure 2C:
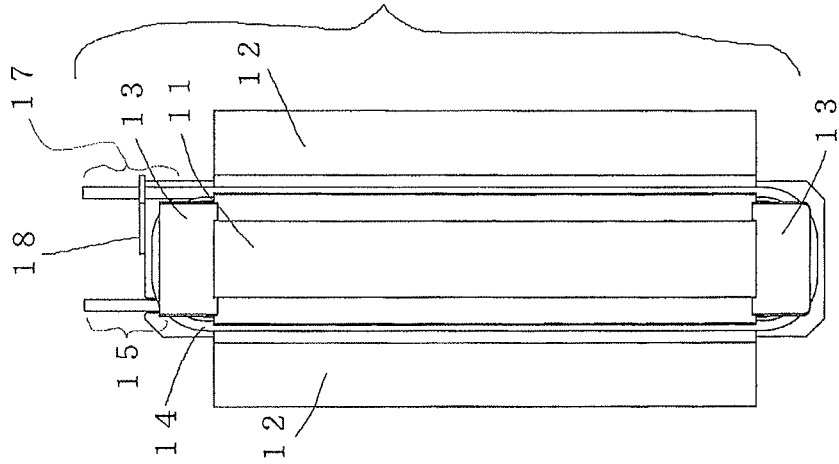
FIG. 2(C) illustrates a perspective view of a stator and an end portion supporting structure for a winding which are to be applied to the rotary electric machine according to the first embodiment according to the present invention.

FIG. 2 illustrate external views, i.e., a front view, a top view, and a perspective view, of the stator and an end portion supporting structure for a winding which are to be applied to the rotary electric machine according to the first embodiment of the present invention. FIG. 2 illustrate a state in which a stator winding 14 is wound around a stator core 11 including a coil bobbin 13 and an insulating paper 12. The stator winding 14 is started to be wound from a stator winding starting end portion 15, and includes a substantially linear section 16 from the last wound portion of the coil bobbin 13 to a stator winding finishing end portion 17.

In the vicinity of the stator winding finishing end portion 17 in the substantially linear section 16 of the stator winding 14, as a structure for holding the stator winding 14, a stator winding finishing end portion supporting member 18 is disposed. The end portion of the stator winding 14 held by the stator winding finishing end portion supporting member 18 is cut at the stator winding finishing end portion 17, resulting in the state illustrated in FIG. 2.

Figure 3:
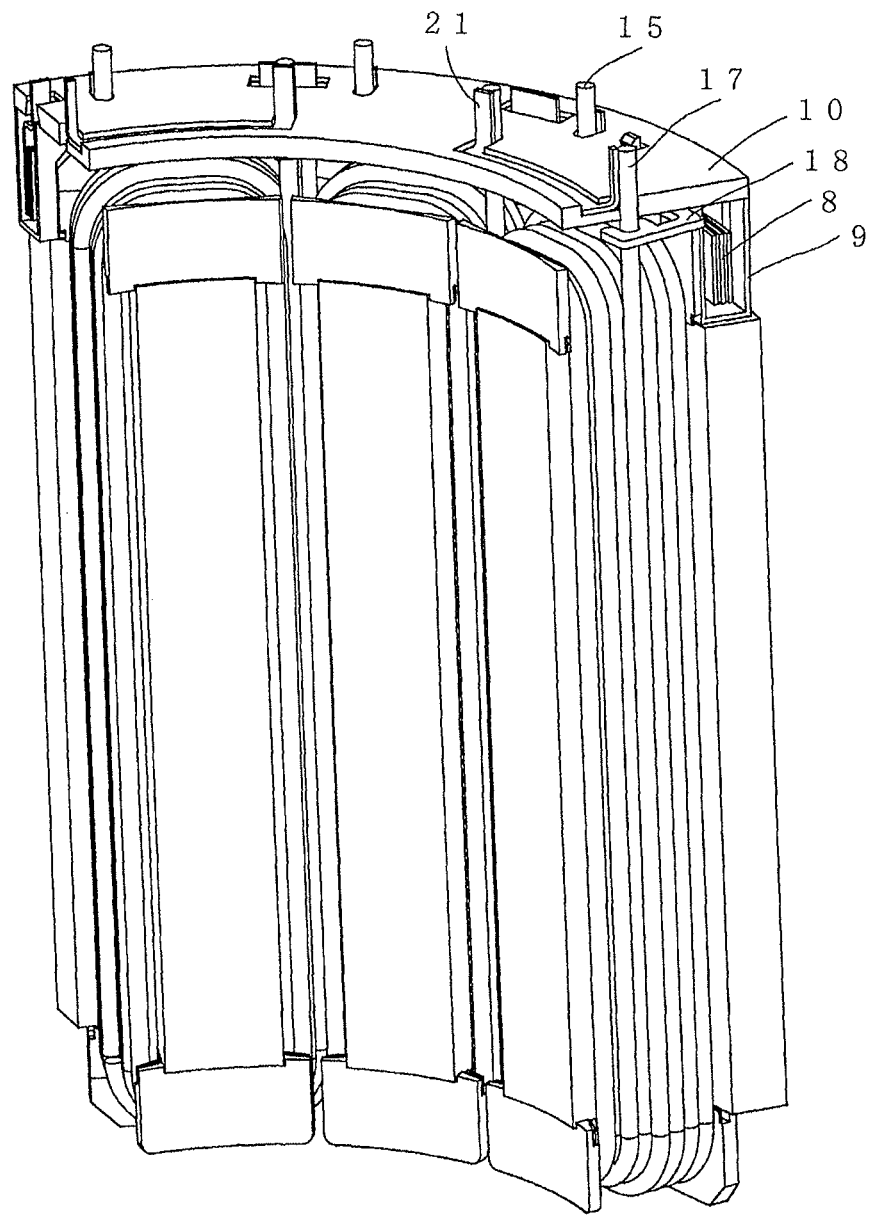
FIG. 3 is a view illustrating an interrelationship between the stator and a connection plate which are to be applied to the rotary electric machine according to the first embodiment of the present invention.

FIG. 3 is a view illustrating an interrelationship between the stator 1 and the connection plate 10 which are to be applied to the rotary electric machine according to the first embodiment of the present invention. The connection plate 10 includes holes which are respectively formed on substantially the same axes as those of both the winding starting end portion 15 and the stator winding finishing end portion 17 of the stator winding 14, and a neutral line 21 which abuts against the stator winding finishing end portion 17.

Both terminal portions of the stator winding 14 are joined at a connection portion of the neutral line 21 to respective electricity supply terminals (corresponding to the bus bar 8) through the holes of the connection plate 10. Viewed from the non-load-side bearing of the rotary electric machine, the connection plate 10 projects toward the rotation axis (radial or central) direction of the stator so as to cover a part of the bus bar holder 9 and the stator (that is, the connection plate 10 projects into the stator upper portion).

In FIG. 3, the stator winding starting end portion 15, which is connected to the bus bar 8 for supplying electricity, passes through the hole of the connection plate 10 together with the connection portion of the bus bar 8. On the other hand, the stator winding finishing end portion 17 connected to the neutral line 21 has a structure in which the neutral line 21 is molded on the connection plate 10 so that only the winding finishing portion of the stator winding 14 passes through the hole of the connection plate 10.

In the thus structured stator 1 of the rotary electric machine, by supporting the stator winding finishing end portion 17 with use of the stator winding finishing end portion supporting member 18, the conventional processes, such as the process for locking the stator winding 14 on the protrusion and the like provided on the coil bobbin 13, are not required.

In particular, when such a concentrated winding stator is applied to an electric vehicle which involves a large electric current, the wire diameter of the stator winding 14 becomes Φ2.5 mm to Φ3.0 mm. Therefore, in order to wind the stator winding 14 around the protrusion of the coil bobbin 13 by using a winding machine so as to lock the stator winding 14 thereon, a bending process involving a large load is required. As a result, the winding process requires a longer time, the productivity is deteriorated, and larger equipment is needed.

On the other hand, in the first embodiment, even when the wire diameter of the winding becomes large, the end portion 17 of the stator winding 14 can be easily fixed by providing the stator winding finishing end portion supporting member 18. As a result, the work amount within the same step can be decreased so that the tact time can be shortened, which enhances the productivity. Moreover, the equipment can be simplified because the bending process of the stator winding 14 is not required.

When a thick stator winding 14 is wound around the protrusion provided on the coil bobbin 13, the protrusion of the coil bobbin 13 is also required to have a high strength.

However, when the fixing of the winding is performed according to the first embodiment which requires no bending process for the stator winding 14, the coil bobbin 13 can be reduced in size and weight.

Moreover, when the stator winding finishing end portion supporting member 18 is formed as a separate member, various patterns of the winding can be dealt with merely by changing this stator winding finishing end portion supporting member 18.

Moreover, when the stator winding finishing end portion supporting member 18 is formed as a member separate from the coil bobbin 13, it is also possible to mount the stator winding finishing end portion supporting member 18 after the winding operation is finished. With this, for example, even when there is employed a winding pattern in which the stator winding finishing end portion 17 is located in the vicinity of an intermediate position of the stator in the radial direction of the rotary electric machine, the winding path of the stator winding 14 to be wound is not interrupted so that efficient winding can be performed.

As described above, when the stator winding finishing end portion 17 is supported by using the stator winding finishing end portion supporting member 18 before the winding process is finished, no tool for holding the terminal portion of the winding is required until the stator 1 is assembled into an annular shape.

In addition, the connection plate 10 projects toward the rotation axis, and the neutral line 21 is arbitrarily disposed thereon. Thus, the neutral line 21 can be disposed in correspondence with the position at which the stator winding finishing end portion 17 passes through the connection plate 10. As a result, not only during the winding process, but also when the connection plate 10 is connected, the bending process of the stator winding finishing end portion 17 can be omitted.

Moreover, the number of the bus bars 8 contained in the bus bar holder 9 becomes only three, i.e., U-, V-, and W-phases. As a result, it is possible to reduce the thickness of the bus bar holder 9 in the radial direction of the rotary electric machine to thereby downsize the rotary electric machine.

In the case where no stator winding finishing end portion supporting member 18 is provided, the position of the stator winding finishing end portion 17 is not fixed. Therefore, the stator winding finishing end portion 17 is required to be fixed by the connection plate 10, and then, under the state of FIG. 3, be subjected to a varnish application. On the other hand, in the case of the present invention including the stator winding finishing end portion supporting member 18, even under the state without the connection plate 10, the stator winding finishing end portion 17 can be disposed at a predetermined position so that a varnish application can be performed even before assembling the connection plate 10, and the varnish application can be performed at an arbitrary step.

Moreover, in the case where no stator winding finishing end portion supporting member 18 is provided, as described above, after the stator winding 14 is fixed by the connection plate 10, a varnish application needs to be performed. Therefore, when the varnish application is performed from the non-load side of the rotor, a part of the stator winding 14 may be behind the connection plate 10 so that the varnish application cannot be performed uniformly. Moreover, in order to avoid the non-uniform varnish application, the varnish application is required to be performed from the load side of the rotor 7, thereby limiting the direction of the work so as to deteriorate the degree of freedom for manufacturing.

On the other hand, in the case of the present invention in which the stator winding finishing end portion 17 is supported by the stator winding finishing end portion supporting member 18, the varnish application can be performed before the stator winding finishing end portion 17 is covered with the connection plate 10. As a result, even in the case where the terminal line is formed to be substantially linear and the connection plate 10 projects in the direction (radial or central direction) toward the rotation axis of the rotor (i.e., the connection plate 10 projects into the stator upper portion), the varnish application can be performed uniformly.

Note that, in FIG. 3 above, the stator winding finishing end portion 17 is connected to the neutral line 21, but, depending on the winding pattern, the stator winding starting end portion 15 may be connected to the neutral line 21.

In FIG. 3, the central axis of the winding finishing line is substantially parallel to the rotation axis of the rotor. However, even when the central axis of the winding finishing line is inclined with respect to the rotation axis, such a case does not deviate from the spirit of the present invention which is intended to eliminate the bending process of the terminal portion.

As described above, according to the first embodiment, there is provided a structure which does not require the stator winding terminal portion to be wound around the coil bobbin, and which supports the winding terminal portion so as not to be loosened under a state in which the winding is finished so that the winding terminal portion is substantially linear. As a result, the coil bobbin can be reduced in size and weight, and hence there can be obtained a rotary electric machine which enables simplification of production equipment and enhancement of production efficiency.

Note that, in the first embodiment, there has been described the case where the stator winding finishing end portion supporting member 18 is formed as a separate structure. Because of this separate structure, even when the winding pattern is changed (that is, the position of the stator winding finishing end portion 17 is different in the radial direction of the rotary electric machine), the change in winding pattern can be dealt with merely by changing the end portion supporting member. Moreover, the end portion supporting member can be mounted after the winding process, and hence the end portion supporting member does not become a hindrance in the winding process.

Figure 4:
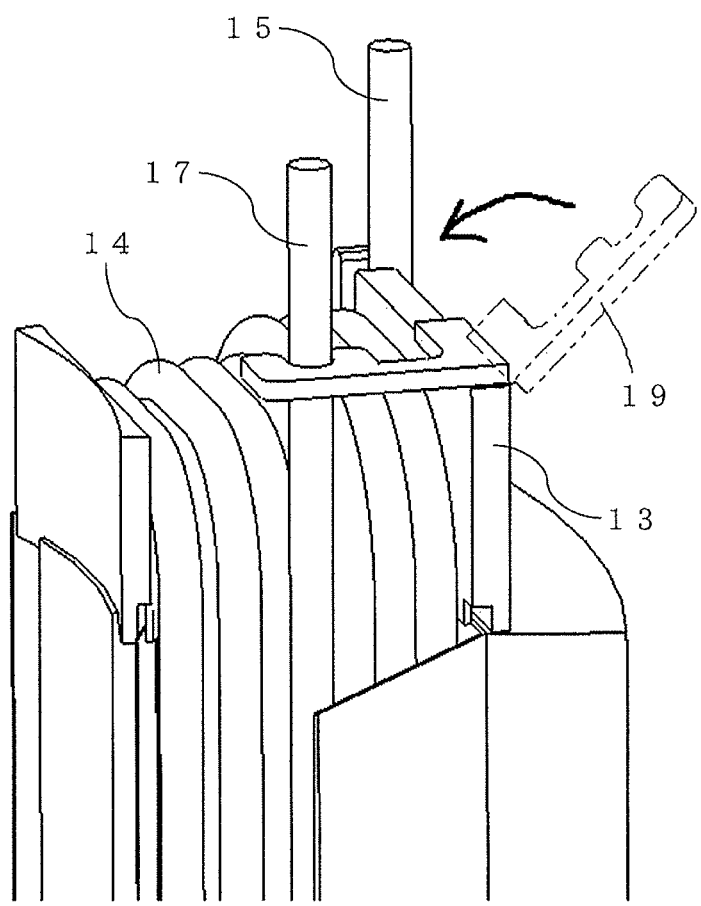
FIG. 4 is an explanatory diagram illustrating an abutment portion between a stator winding finishing end portion supporting member and a stator winding according to the first embodiment of the present invention.

However, the structure for preventing the end portion supporting member from becoming a hindrance in the winding process is not limited to the above-mentioned separate structure. FIG. 4 is an explanatory diagram illustrating an abutment portion between a stator winding finishing end portion supporting member 19 and the stator winding 14 according to the first embodiment of the present invention. FIG. 4 illustrates a structure in which the stator winding finishing end portion supporting member 19, which is foldable and formed integrally with the coil bobbin 13, is folded down after the winding operation so as to support the stator winding 14. Here, the term "foldable" refers to a structure in which the stator winding finishing end portion supporting member 19 is movable between a position during the winding process and a position after the winding process.

In this way, with adoption of the stator winding finishing end portion supporting member 19 having the foldable structure which is formed integrally with the coil bobbin 13, it is possible to prevent the end portion supporting member from becoming a hindrance in the winding process, thereby improving the operation efficiency.

Second Embodiment

In the first embodiment, there has been described the case where a single abutment portion is provided between the stator winding finishing end portion supporting member 18 and the stator winding 14. On the other hand, in a second embodiment of the present invention, there is described a case where a plurality of abutment portions are provided.

Figure 5:
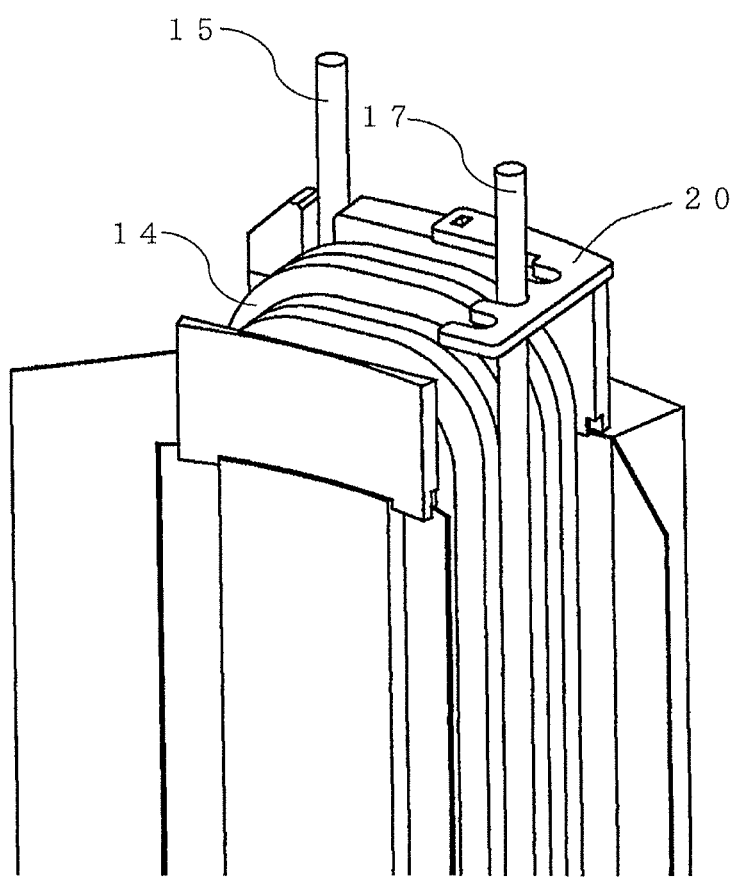
FIG. 5 is an explanatory diagram illustrating abutment portions between a stator winding finishing end portion supporting member and a stator winding according to a second embodiment of the present invention.

FIG. 5 is an explanatory diagram illustrating the abutment portions between a stator winding finishing end portion supporting member 20 and the stator winding 14 according to the second embodiment of the present invention. As illustrated in FIG. 5, the stator winding finishing end portion supporting member 20 according to the second embodiment includes a plurality of notch portions for holding the stator winding 14 (FIG. 5 illustrates the case where two notch portions are provided.)

With this, a plurality of types of winding patterns can be dealt with by the single type of stator winding finishing end portion supporting member 20. That is, even when the position of the stator winding finishing end portion 17 is different in the radial direction of the rotary electric machine, such a case can be dealt with the single type of the stator winding finishing end portion supporting member 20 including the plurality of notch portions.

As described above, according to the second embodiment, the stator winding finishing end portion supporting member includes the plurality of notch portions for holding the stator winding. With such a structure, in addition to the advantageous effects of the first embodiment, there can be obtained an advantageous effect that the single type of stator winding finishing end portion supporting member can deal with the plurality of types of winding patterns.

Note that, in the second embodiment, there has been described the case where the stator winding finishing end portion supporting member 20 having the plurality of abutment portions for the stator winding is formed as a separate structure. However, the present invention is not limited to such a structure, and similarly to the structure of FIG. 4 in the first embodiment, the stator winding finishing end portion supporting member 20 can be structured so as to be movable between the position during the winding process and the position after the winding process, and can be structured integrally with the coil bobbin 13, thereby obtaining the similar advantageous effect.

The end portion supporting members 18 to 20 of the present invention can be applied to the stator windings having various cross-sectional shapes. Note that, it is conceivable to apply an edgewise winding of a rectangular wire as the stator winding. However, in the case of the edgewise winding, the winding has a large rigidity in the loosening direction so that the winding can be maintained in the wound state without a support. Accordingly, the end portion supporting members 18 to 20 according to the present invention can exert the supporting effect, especially for the stator winding having a cross section of a substantially circular shape.

In the case where the winding is cut before the winding is fixed by the end portion supporting members 18 to 20, a separate tool or the like is needed until the end portion supporting member is mounted. However, in the present invention, the end portion supporting member is mounted in advance, and after the winding end portion is fixed and supported, the cutting is performed. Accordingly, such a separate tool or the like is not needed.

What is claimed is:

1. A rotary electric machine, comprising:
an annular stator comprising a plurality of stator cores, each stator core having a stator winding including a linear winding section extending linearly adjacent the stator core in an axial direction of the annular stator to a terminal portion, each stator core including a coil bobbin and an insulating paper; and
each of the linear winding sections having an end portion supporting member for supporting the terminal portion of the linear winding section extending from the stator core,
the terminal portion of the stator winding extending substantially linearly in the axial direction of the annular stator to a terminal end of the terminal portion beyond the coil bobbin and the end portion supporting member,
wherein each of the end portion supporting members only partially surround the linear winding section.

2. A rotary electric machine according to claim 1, wherein the end portion supporting member comprises a plurality of notch portions for supporting the terminal portion, the plurality of notch portions being provided at different positions in a radial direction of the annular stator.

3. A rotary electric machine according to claim 2, wherein the end portion supporting member is structured separately from the coil bobbin.

4. A rotary electric machine according to claim 2,
wherein the end portion supporting member is structured integrally with the coil bobbin, and
wherein the end portion supporting member is structured so as to be movable between an upright position during a winding process and a winding end portion supporting position after the winding process.

5. A rotary electric machine according to claim 2, further comprising a connection plate which projects above the coil bobbin when viewed from the axial direction of the annular stator, the connection plate comprising a connection portion provided on substantially the same axial direction of the annular stator.

6. A rotary electric machine according to claim 5, further comprising a neutral line which is disposed on the connection plate, the neutral line being connected to any one of a winding starting end portion of the stator winding and the terminal portion of the stator winding.

7. A rotary electric machine according to claim 2, wherein the stator winding has a cross section of a substantially circular shape.

8. A rotary electric machine according to claim 1, wherein the end portion supporting member is structured separately from the coil bobbin.

9. A rotary electric machine according to claim 1, further comprising a connection plate which projects above the coil bobbin when viewed from the axial direction of the annular stator, the connection plate comprising a connection portion provided on substantially the same axis as the axial direction of the annular stator.

10. A rotary electric machine according to claim 9, further comprising a neutral line which is disposed on the connection plate, the neutral line being connected to any one of a winding starting end portion of the stator winding and the terminal portion of the stator winding.

11. A rotary electric machine according to claim 1, wherein the stator winding has a cross section of a substantially circular shape.

12. A manufacturing method for a rotary electric machine, the rotary electric machine comprising an annular stator comprising a plurality of stator cores, each stator core having a stator winding including a linear winding section extending linearly adjacent the stator core in an axial direction of the annular stator, each stator core including a coil bobbin and an insulating paper,
the manufacturing method comprising winding the stator winding on the stator core, the winding comprising:
supporting a portion corresponding to a terminal portion of the linear winding section extending from the stator core using an end portion supporting member; and
cutting the stator winding after the terminal portion is supported in the supporting of the portion corresponding to the terminal portion,
the terminal portion of the stator winding extending substantially linearly in the axial direction of the annular stator to a terminal end of the terminal portion beyond the coil bobbin and the end portion supporting member,
wherein each of the end portion supporting members only partially surround the linear winding section.

13. A rotary electric machine, comprising:
an annular stator comprising a plurality of stator cores, each stator core having a stator winding including a linear winding section extending linearly adjacent the stator core in an axial direction of the annular stator to a terminal portion, each stator core including a coil bobbin and an insulating paper; and
each of the linear winding sections having an end portion supporting member for supporting the terminal portion of the linear winding section extending from the stator core,
the terminal portion of the stator winding extending substantially linearly in the axial direction of the annular stator to a terminal end of the terminal portion beyond the coil bobbin and the end portion supporting member,
wherein the end portion supporting member is structured integrally with the coil bobbin, and
wherein the end portion supporting member is structured so as to be movable between an upright position during a winding process and a winding end portion supporting position after the winding process.

* * * * *